United States Patent
Botrie et al.

(10) Patent No.: US 6,787,221 B2
(45) Date of Patent: Sep. 7, 2004

(54) CO-DISPENSED COMPOSITIONS FOR GASKETS AND OTHER OBJECTS

(75) Inventors: Alexander Botrie, Toronto (CA); Dorota Ulman, Mississauga (CA)

(73) Assignee: Chemque Incorporated, Ontario (CA)

(*) Notice: Subject to any disclaimer, the term of this patent is extended or adjusted under 35 U.S.C. 154(b) by 119 days.

(21) Appl. No.: 10/084,424

(22) Filed: Feb. 28, 2002

(65) Prior Publication Data

US 2002/0122928 A1 Sep. 5, 2002

Related U.S. Application Data

(63) Continuation-in-part of application No. 09/534,473, filed on Mar. 24, 2000, now abandoned.

(30) Foreign Application Priority Data

Mar. 24, 2001 (CA) ............................... PCT/CA01/00399

(51) Int. Cl.[7] ................................................. B32B 3/26
(52) U.S. Cl. ................................... 428/304.4; 264/45.4
(58) Field of Search ........................... 428/318.4, 318.6, 428/319.3, 319.7, 319.9, 304.4; 264/45.4, 45.9

(56) References Cited

U.S. PATENT DOCUMENTS

| | | | |
|---|---|---|---|
| 3,615,975 A | 10/1971 | Gillern et al. | |
| 3,931,449 A | 1/1976 | Hirata et al. | |
| 4,205,111 A | 5/1980 | Pip et al. | |
| 4,244,156 A | 1/1981 | Watts, Jr. | |
| 4,318,959 A | 3/1982 | Evans et al. | |
| 4,507,359 A | 3/1985 | Powers, Jr. | |
| 4,857,668 A | 8/1989 | Buonanno | |
| 4,931,479 A | 6/1990 | Morgan | |
| 4,968,854 A | 11/1990 | Benn, Sr. et al. | |
| 4,977,295 A | 12/1990 | Chin et al. | |
| 5,141,770 A | 8/1992 | Benn, Sr. et al. | |
| 5,616,420 A | 4/1997 | Yamaoka et al. | |
| 5,709,956 A | 1/1998 | Yamabe et al. | |
| 5,730,446 A | 3/1998 | Taylor et al. | |
| 5,902,956 A | 5/1999 | Spies et al. | |
| 6,096,413 A | 8/2000 | Kalinoski et al. | |
| 6,103,152 A | 8/2000 | Gehlson et al. | |
| 6,117,508 A | 9/2000 | Parsonage et al. | |
| 6,173,970 B1 | 1/2001 | Choudary et al. | |
| 6,190,751 B1 | 2/2001 | Sylvester | |

FOREIGN PATENT DOCUMENTS

| | | |
|---|---|---|
| DE | 195 41 478 A1 | 5/1997 |
| WO | WO 01/71223 A2 | 9/2001 |

*Primary Examiner*—Stanley S. Silverman
*Assistant Examiner*—Colleen P. Cooke
(74) *Attorney, Agent, or Firm*—Banner & Witcoff Ltd.

(57) ABSTRACT

A gasket or other comprising a core and a flexible outer layer prepared by co-dispensing at a temperature of about 15° C. to about 30° C., a core composition and an outer layer composition, wherein the core composition is an elastomer or a foam and comprises at least two reactive components, wherein each component has a viscosity at 25° C. of less than $10^6$ cps. The core and outer layer compositions are applied in a non-solid state. The outer layer is preferably at least a two reactive-component elastomer or foam. A method for producing a gasket or other object comprising co-dispensing a core composition and an outer layer composition at a temperature of about 15° C. to about 30° C., wherein the core composition is an elastomer or a foam and comprises at least two reactive components, wherein the composition has a viscosity at 25° C. of less than $10^6$ cps.

23 Claims, 3 Drawing Sheets

CO-DISPENSED COMPOSITIONS FOR GASKETS AND OTHER OBJECTS

This application claims priority of copending application U.S. Ser. No. 09/534,473, filed Mar. 24, 2000, and PCT application PCT/CA01/00399 filed Mar. 24, 2001, both of which are hereby incorporated by reference in their entirety.

FIELD OF THE INVENTION

This invention relates to compositions for co-dispensed gaskets and other objects and methods of manufacture thereof.

BACKGROUND OF THE INVENTION

There is a need for gaskets, in the form of seals and other products, which can seal enclosure cabinets and electrical and electronic housings to provide protection against moisture and dust. Such gaskets are placed in covers and between frames, panels, and doors of electronic equipment, cabinets, and housings. Such gaskets may also need to provide an air and water-tight seal.

There are many applications in which outer layer(s) of a gasket and a core of the gasket require different and possibly mutually inconsistent properties, and thus proposals have been made for gaskets formed with an outer layer and a core of different materials.

For example, the prior art describes the production of prefabricated gaskets for electromagnetic shielding having an inner layer and an outer layer. The inner layer provides the gasket with physical properties such as compression deflection, tensile strength, and elongation. The outer layer provides the surface with properties such as electrical conductivity. Both the inner layer and the outer layer are elastomeric.

In these co-extruded compositions, the starting materials are single-component thermoplastic polymers. They are usually in the form of solid pellets, powder or granules. Heat is required and the solid is converted into a plastic molten state. The heat may be generated by both the screw and heating elements used in the co-extrusion process. Heating temperature varies depending on the melting point of the polymer. Generally the starting materials must be heated to above 100° C. and usually much higher. The extruder screw delivers the molten plastic or rubber through a die. The plastic is heated sufficiently so that it will pass through the die and retain the shape imparted by the die. The die is the component that gives the shape to the thermoplastic mass. In most instances, this is entirely a thermoplastic process.

In the above, there are no chemical reactions taking place. The end product has the same chemical composition and cross-linking density as the starting material. Only the shape has been changed. After the part exits through the die, it usually undergoes a cooling stage so that it maintains its shape. Except for the final step, co-extrusion is very similar to injection molding. Instead of forcing the molten polymer through a forming die, injection molding forces the molten polymer into a closed mold. As soon as heat is removed, the polymer starts to solidify. In either case, the polymer must cool so that the extruded or molded part retains its shape.

In other instances, the one component solid polymer will contain reactive sites depending on the reactive component used. The reaction can occur in the presence of water, heat, UV or electron beam radiation as well as other methods. However, the retention of the shape imparted by the forming die is initially due to cooling of the molten polymer. The chemical reaction, if any, takes place afterwards.

It is common to co-extrude elastomers by this extrusion process. It is currently not possible to co-extrude a thermoplastic foam inside a thermoplastic elastomer. The thermoplastic foam must be extruded and cooled and the elastomer applied afterwards. Otherwise, the foam walls will melt and the foam will collapse when it contacts the hot, molten outer layer material. Heat activated and moisture-curing polymers can also be co-extruded by this process. However, here again it is not possible to co-extrude a foam inside one of these elastomers.

The above-described extruded products also cannot be formed-in-place. They can only be made in rolls or strips. After they are extruded, they must be cooled before they can be applied to a part. The degree of cooling is critical when application to thermoplastic materials is required. The extruded elastomer must be cooled below the melting point of the part it is being applied on or the part will melt or warp. Once cooled, they have a fixed shape and will not bond directly onto a surface without the use of adhesives. Furthermore, these materials cannot be formed-in-place because the ends cannot be attached onto each other without the use of external adhesives or by remelting the ends and fusing them together.

The two layers of an EMI gasket can be co-extruded such as described in U.S. Pat. No. 4,968,854, or the inner layer can be formed first with the outer layer applied afterwards as described in U.S. Pat. No. 5,141,770. The inner layer usually consists of a one-component thermoplastic resin or a one-component, heat-cured extruded rubber. The outer layer is also a one-component thermoplastic resin or a one-component, heat-cured extruded rubber. The outer component can also be made from a low viscosity coating dispersion containing an elastomeric binder, a metallic material, a curing agent, and a diluent, such as an organic solvent. The solvent is used to substantially reduce the viscosity of the coating, the inner layer being in this case extruded and solidified prior to the application of the coating.

Co-pending U.S. application Ser. No. 09/421,559, filed Oct. 20, 1999, which application is hereby incorporated by reference in its entirety, describes gaskets having a non-conductive substrate and a conductive outer layer. This gasket is prepared by applying the outer layer over the substrate (core) or by co-extruding the two components. However, these methods require the core to be at least partially if not fully cured prior to application of the outer layer. Or, if co-extruded, both the core and outer layer are at least partially cured and thus are not moldable or formable into a desired shape and thus are not formed directly on the part.

Thus, the above-described gaskets are prefabricated and cannot be extruded or dispensed directly onto the part to be gasketed.

BRIEF SUMMARY OF THE INVENTION

The present invention is a further development of form-in-place and foam-in-place technology. It was discovered that at least two layer (core and outer layer) form-in-place and foam-in-place gaskets can be prepared by co-dispensing a core composition and an outer layer composition at ambient temperatures.

The present invention is directed to a gasket or other object comprising a core and a outer layer prepared by co-dispensing at a temperature of about 15° C. to about 30° C., a core composition and an outer layer composition, wherein the core composition is at least a two reactive-component foam or elastomer. The core composition may be a liquid or paste. The composition, when mixed together, has a viscosity at 25° C. of less than $10^6$ cps. When mixed together, the components react together to produce a solid thermosetting elastomer or foam.

The compositions to produce the gasket or other object of the invention are formulated to dispense through low pressure meter-mix dispensing equipment. By "low pressure" it is meant that the dispensing pressure is less than 1,000 psi. The nozzle of the meter-mix-dispenser may be attached to a robotic arm for form-in-place and foam-in-place applications.

Importantly, at least the core composition is a two reactive component polymer so that the viscosities of the starting materials will be low, the rate of crosslinking can be controlled by the formulator, and the curing rate of the core center and the surface of the core will be the same.

The core and outer layer compositions are applied in a non-solid state. By non-solid, it is meant that the viscosity of the composition at 25° C. is less than $10^6$ cps, preferably less than $10^5$ cps. By solid, it is meant that the viscosity of the composition at 25° C. is greater than $10^6$ cps. The composition may also be applied in an uncured state.

In a preferred embodiment, the outer layer is at least a two reactive-component elastomer or foam. In a further embodiment, the core is a foam, and the co-dispensed core composition completes at least foaming prior to drying or curing of the outer layer composition.

The viscosities of the core and outer layer compositions vary from a thin flowable liquid to a highly thixotropic paste. If the core and outer layer compositions are compatible, the layers may flow into one another when they are co-dispensed. In this case, the core and outer layer compositions should be thixotropic with a thixotropic index (TI) of each greater than 3.0. If the two compositions are not compatible, lower viscosities and thixotropies may be used.

The present invention is further directed to a method for producing a gasket or other object comprising co-dispensing a core composition and an outer layer composition at a temperature of about 15° C. to about 30° C., wherein the core composition is at least one of an elastomer and a foam, comprises at least two reactive components, and has a viscosity at 25° C. of less than $10^6$ cps.

Preferably, the core composition and outer layer composition are dispensed through low pressure meter-mix dispensing equipment.

Further features of the invention will be apparent from the following description and examples.

DETAILED DESCRIPTION OF THE INVENTION

Figure 1:
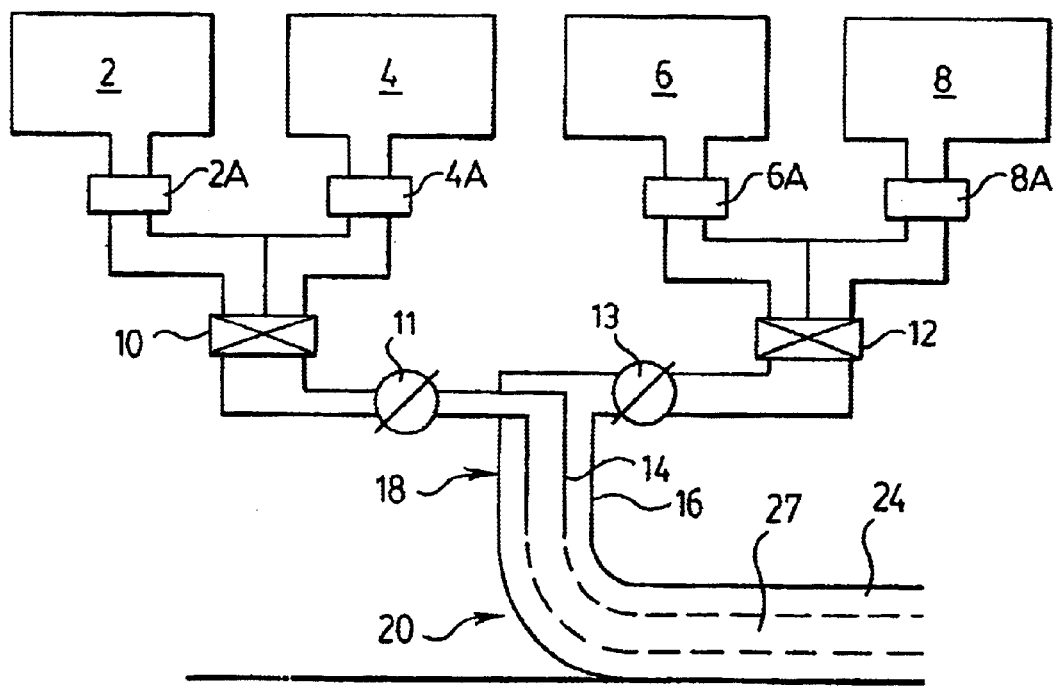
FIG. 1 is a schematic diagram of an apparatus for producing gaskets according this invention.

The present invention is directed to preparing versatile gaskets and other objects by co-dispensing a core composition and an outer layer composition together at room temperature. The compositions of the invention may be used in conjunction with a meter-mix dispenser attached to a three or six axis robot to be formed in place directly on the part to be gasketed. The same equipment may also be used to make prefabricated gaskets. The composition may also be dispensed into an open or closed mold to produce molded gaskets and objects.

The term "gasket" includes seals and other products designed to seal or cushion parts. Other objects that may utilize the technology of the instant invention include automotive seat cushions, which have a foam inner core and an elastomer outer layer, or shoe inserts, which may have either a non-curing gel inner layer or a foam inner layer and an elastomer outer layer. The outer layer may cover the entirety of, or a portion of, the core.

The core composition comprises a two reactive-component material that is combined just prior to dispensing. The outer layer composition may be a two reactive-component material or a one-component solvent based material.

At least one of or both of the core composition and outer layer composition may be a liquid. Alternatively, at least one of or both of the core composition and outer layer composition may be a thixotropic paste so that the paste flows out of the dispenser but then stays in place after dispensing.

A thixotropic system exhibits a time-dependent decreasing viscosity or shear stress at a constant shear rate. When the shearing force is eliminated, the viscosity returns over a period of time to its original "at-rest" value. This means that a thixotropic liquid or paste will decrease in viscosity when subjected to shear stress. When the shear stress is removed, the liquid or paste will revert back to its original thicker state.

By two reactive component it is meant that at least two reactive components are present and more than two reactive components may be present. At ambient temperatures, the viscosity of the core composition is between about 1 and $10^6$ cps, preferably between about 1 and about $10^5$ cps. Preferably, at ambient temperatures, the viscosity of the outer layer composition is likewise between about 1 and $10^6$ cps, more preferably between about 1 and about $10^5$ cps.

The core composition and the outer layer composition are co-dispensed simultaneously at about room or ambient temperature, i.e. temperatures of about 15° C. to about 30° C. Unlike prior art co-extrusion processes, no external heat is required. After dispensing, the core cures from the combination of the two-reactive components.

The inner layer may be dispensed as a one component material and get the second component from the outer layer, e.g. the inner core may require moisture to cure. This moisture may be made available from the outer layer.

The outer layer may cure after exposure to a reaction-promoting atmosphere, such as humidity, oxygen, UV radiation, or simply by the combination of two-reactive components prior to dispensing. If a solvent-based outer composition is used, curing may occur simply upon evaporation of the solvent. The solvent may also be used to adjust the viscosity of the outer layer. The outer layer may simply dry by evaporation of the solvent.

At ambient temperatures, the drying or curing process can take from a few seconds to many hours depending on the needs of the application. For example, the selection of the polymer system and the catalysts allows control of the curing time and the curing profile. Those familiar in the art are aware how this may be accomplished.

External heat may be applied to any of the individual components or to the mixed composition as a processing aid. However, heat is not necessary for the process to occur. It serves only to accelerate the process. In other words, in a co-extrusion process, heat is required to convert the thermoplastic pellets to a flowable state. In a co-dispense process, heat is not required to make the compositions flowable. However, heat can be used, if desired, to increase the curing rate of the two component compositions.

Although the compositions are co-dispensed at about room temperature, heat may be applied to the inner core and/or outer layer components to accelerate the reaction rate. Heat may also be used to reduce the viscosities of the components so that they will flow more readily. The part to be gasketed may also be heated. The gasketed part may also be heated. The applied heat will usually be in the range of 50° C.–100° C. However, heat is not necessary for this co-dispense process and serves only as a processing aid.

The flow properties are important in co-dispensing applications. Meter-mix-dispensing equipment can be used to place a form-in-place, co-dispensed gasket on a surface. For instance, meter-mix-dispensing equipment attached to an X-Y-Z or 6 axis robot is commonly used to accurately locate two-component form-in-place and foam-in-place gaskets onto a surface or into a mold.

The compositions may be liquid or pastes as they exit the nozzle. For co-dispensing into a closed mold, the components of both layers may need to have a low viscosity and low thixotropy. In other instances, the components of one layer may need to be low viscosity and low thixotropy and the other may need to be high thixotropy. These all can be easily achieved with co-dispense systems using two-component thermosetting polymers.

An advantage to using at least two reactive component compositions is that the components, such as the polymers and catalysts, may be selected to control the rate of curing and the time that curing should begin. For example, an outer layer composition can be formulated to remain a liquid or a thixotropic paste until the foaming and/or curing of the core is complete. This is particularly important when the core forms a foam. The outer layer should not begin to harden until the core has completed its foaming (expansion) cycle.

Once discovered that two compositions could be co-dispensed to form a moldable and formable gasket, the selection of reactants, catalysts, and the like to provide the desired end properties of the foams and elastomers is within the skill of the art. Advantages to a gasket comprising at least a foam core and/or outer layer include low compression deflection and low compression set. An advantage to an elastomer outer layer could be a water-tight seal or skin, UV resistant, chemical resistant, or electrical conductivity. The combination of properties obtained by co-dispensing is not obtainable by regular foam-in-place gasketing or co-extrusion process.

For example, it is necessary to use polyurethane foams made with aliphatic isocyanates for outdoor applications requiring good UV resistance. However, aliphatic polyurethane foam gaskets and seals are more expensive and much more difficult to process than polyurethane foams made with aromatic isocyanates. By using this co-dispense process an aliphatic polyurethane elastomer can be co-dispensed over an aromatic polyurethane foam core. The outer layer provides the UV and weather resistance, the inner core provides all the desired polyurethane foam properties. Furthermore, this co-dispensed system will be considerably more cost effective than a straight aliphatic system.

The viscosities of the liquids in the core and the outer layer can be adjusted to utilize nozzles designed for liquids, to ensure that the liquids stay in place upon application to the part to be gasketed, and to allow flow into a mold. The use of a mold allows for the use of relatively low viscosity compositions whereas the use of in situ formation on flat surfaces usually requires the compositions to be highly thixotropic (T.I.>3.0) in order for such materials to remain in place while curing.

The liquid and paste formulations allow the gasket or other object to be formed in situ or in a mold. If formed in situ, the gasket may bond onto the part as it cures.

The core and outer layers may be formed of different density foams, or the outer layer may be of a material selected to provide a thin, tough, flexible, elastomeric skin.

The outer layer may be a rigid or flexible elastomer or foam. It may be thermoplastic or thermosetting. The polymer can be a moisture cure system or a two reactive-component system such as polyurethane, silicone, polyester, and epoxy.

The core may be flexible or rigid and may be a foam or elastomer. Examples of suitable core compositions are two-component polyurethane or silicone. Preferably the core composition is thermosetting. The composition may cure or harden by moisture curing or cross-linking. If moisture cured, the moisture component may be obtained from moisture in the outer layer.

A cured polyurethane or silicone elastomer typically has a minimum hardness of about Shore A 30 while maintaining good properties. Cured polyurethane and silicone foams can be made with hardness lower than Shore 00 10 while maintaining the desired properties. It is possible to produce foams with hardness of Shore 00 of zero or less.

A suitable polyurethane, two reactive-component foam core or outer layer composition includes a polyol, a catalyst, a surfactant, water, a thixotrope, and a diisocyanate. Suitable elastomeric two reactive-component compositions include a polyol, a catalyst, a thixotrope, and a diisocyanate. The polyol(s) and diisocyanate components are not combined until just prior to application.

The outer layer also may be a solvent-based coating. The two reactive-component compositions or solvent-based coatings are preferably selected to dispense and cure at about ambient temperatures. Suitable reactants include, but are not limited to, polyether diols, polyether triols and combinations thereof. A preferred polyol is ethylene oxide capped polyether triol.

Catalysts, surfactants, and/or foam stabilizers may be added to the foams or elastomers as appropriate. Suitable catalysts include, but are not limited to, triethylene diamine and dibutyl tin dilaurate. Suitable surfactants include silicone surfactants. Suitable thixotropes include Cab-O-Sil, which is a fumed silica available from Cabot Carbon.

Suitable diisocyanates include methylene diisocyanate, isophorone diisocyanate and polymeric diphenylmethane diisocyanate.

In an embodiment of the invention, the core is prepared from a two reactive-component silicone-based elastomer. For example, the two components comprise a silicone and a thixotrope. A moisture-curing outer layer is formed from a moisture-curing silicone polymer and a solvent such as toluene.

If conductivity is desired in the outer layer, at least one conductive filler can be dispersed throughout the elastomer or foam in an amount effective to achieve the desired conductivity. This is generally in the amount of from about 20 parts by weight to 90 parts by weight based on the weight of the polymer and preferably from about 40 parts by weight to about 80 parts by weight.

The one or more conductive fillers may be noble metals, base metals, noble metal coated non-noble metals, noble metal plated glass, noble metal plated plastics, noble metal plated ceramics and carbon blacks. Suitable conductive fillers include, but are not limited to silver, nickel, aluminum, copper, steel, and coatings of these on metallic and non-metallic substrates.

The conductive filler may be of any suitable form or shape such as particles, spheres, powders, flakes, and the like. If conductive particles are used, the size of the particles is typically between 1 micron and 80 microns, preferably, 10 microns and 30 microns, most preferably 20 microns diameter. However, it may be beneficial to use fillers other than particles.

Conductive coatings can lose their conductivity on repeated flexing and compressing. Thus, in accordance with a preferred embodiment, conductive fillers with high aspect ratios can be used which allow flexing of the coating without loss of conductivity in both foams and elastomers. Examples of such high aspect ratio fillers are flakes, fibers, filaments, needles, slivers and hollow microspheres. High aspect ratio fillers provide better particle-to-particle contact at lower load levels. This provides better conductivity at lower loading levels than is required when using fillers with low aspect ratios. The use of high aspect ratio fillers permits higher binder concentration. Furthermore, higher physical properties such as tensile strength, are obtainable with these fillers.

The diameter of high aspect fillers should be between about 0.1 micron and about 100 microns, preferably between about 15 and about 30 microns. The aspect ratio (L/D) is preferably between about 10/1 and 3000/1, more preferably between about 20/1 and 100/1. The concentration of the high aspect ratio fillers is between about 0.1% and about 60% by volume, preferably between about 10% and about 40%.

Hollow microspheres also show good retention of conductive properties on flexible substrates. However, coatings using spherical fillers need to be thicker than coatings using conductive flakes and other high aspect ratio materials. Although not wishing to be limited by any theory, it is possible that the spherical fillers produce plastics that retain their conductivity on flexing because the spheres stack on top of each other. Spherical fillers with some compressibility give superior properties to those that are rigid. Spherical fillers produce gaskets and seals with lower physical properties than other high aspect ratio fillers.

A pigment also may be added to the core or outer layer composition to provide a desired color to the gasket. Suitable pigments include titanium dioxide, iron oxides and carbon black. Typically, the pigment is added to the outer layer. The addition of pigments to the outer layer will also improve its UV resistance.

Other fillers may be added to the outer layer such as thermally conductive fillers, inert fillers, reinforcing fillers, microwave absorbing fillers and flame retardant fillers.

The co-dispensing process provides form-in-place or foam-in-place gaskets, heretofore not known in the art. The gasket may be produced in situ or it may be formed by co-dispensing the inner and outer layers into a mold and then curing. The ability to use foams and/or elastomers having widely different properties provides versatility. The use of low-density co-dispensed foams provides a highly cost-effective process.

When the core is a thermosetting foam, it should fully rise before the outer layer starts to cure. Thus, the properties of the outer layer should be selected to cure after the foam has expanded.

If adhesion is required between the two layers, it is preferable that one layer is not fully cured before the other. The use of adhesion promoters such as organic silanes and titanates may be used. In some instances, it is preferable that the layers do not adhere to each other. In this case, the curing of the outer layer should not occur until the inner core is completely cured. Release agents, such as silicone oils, can also be used in the outer layer to prevent it from bonding to the inner core.

The gaskets may be used to provide almost any type of seal and can be used on any type of surface.

The present invention will be further exemplified by showing how the two flowable compositions are prepared and co-dispensed from a dispensing apparatus. FIG. 1 shows a dispensing apparatus for producing gaskets using a two reactive-component resin system for the core and a two reactive-component resin system for the outer layer. The dispensing apparatus has reservoirs 2, 4, 6 and 8. Reservoirs 2 and 4 hold the two components of the core material. Reservoirs 6 and 8 hold the two components of the outer layer material. Metering pumps 2A, 4A, 6A, and 8A dispense correct quantities of each component. The components of the core and outer layer are passed through mixers 10 and 12 and shut-off valves 11 and 13, and are then extruded through co-axial tubes 14 and 16 of nozzle 18 to form a co-dispensed gasket 20, having a core 27 and an outer layer 24. The resulting gasket will have an elastomeric or foam core 27 and an elastomeric or foam outer layer 24.

Figure 2:
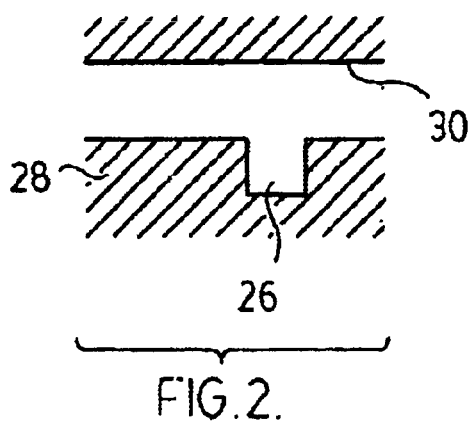
FIG. 2 is a fragmentary cross-sectional view of two machine parts, one with a groove to be gasketed with a foam in-place co-dispensed gasket.

FIG. 2 is a cross-sectional view of a part with a groove 26 to be gasketed, illustrating one way in which a co-dispensed gasket can be formed-in-place. The cover 30 can be applied after the gasket is formed. The surface of the groove and the composition used for the outer layer will determine whether the outer layer bonds to the surface. The co-dispensed gasket can also be applied on a flat surface rather than in a groove.

Figure 3:
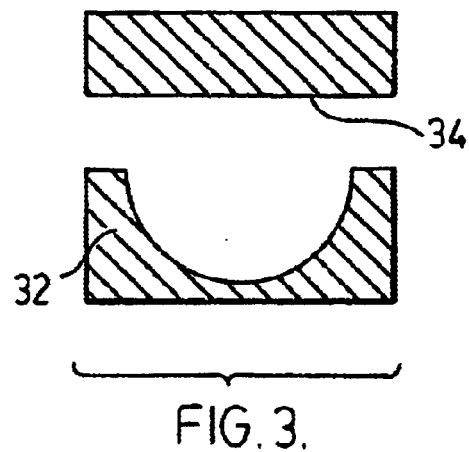
FIG. 3 is a cross-sectional view of a mold used to form prefabricated gaskets in accordance with this invention.
Figure 4:
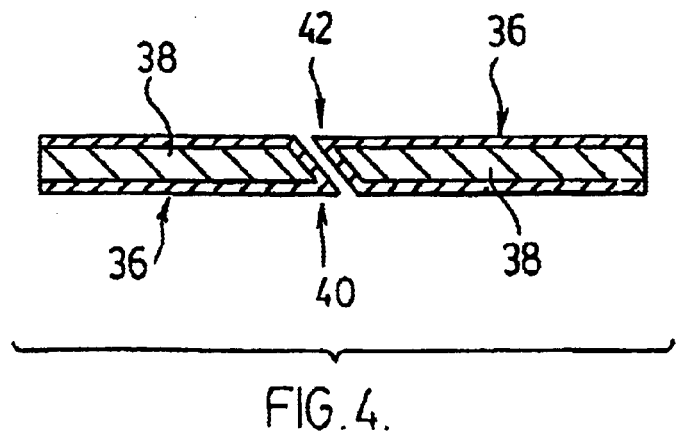
FIG. 4 is a fragmentary cross-sectional view showing an overlap of ends of an extrusion forming a co-dispensed gasket.

FIG. 3 is a cross-sectional view of a mold used to shape prefabricated gaskets in accordance with the invention. The gasket is dispensed into the bottom of the mold 32. The cover 34 is applied before the gasket sets. In this case, the outer layer and the mold surface are selected so that the cured gasket will release from the mold surface. FIG. 4 is a longitudinal cross-sectional view of a portion of a co-dispensed gasket in which the beginning and end of the extrusion overlap. This type of overlap is created by starting the dispensing of the outer layer material 36 before starting the dispensing of the core material 38, and continuing dispensing of the outer layer material after dispensing of the core material has been stopped. This may be conveniently achieved by using valves 11 and 13 in FIG. 1. A continuous, closed-loop gasket is formed if the ends 40 and 42 of the dispensed material are overlapped. An open-ended gasket is formed without the overlap. A programmable robot may be mounted on nozzle 18 in order to produce gaskets of many sizes and shapes.

FIGS. 5a–5d are end views of some different nozzle configurations for co-dispensing gaskets in accordance with this invention. It will be noted that the nozzles are not necessarily concentric or of similar profile, and that the nozzle for the outer layer material 51 may not fully surround the nozzle for the core material 52, providing a gasket in which the core material is not fully enveloped by the outer layer. This may be necessary or desirable in some applications.

Figure 5A:
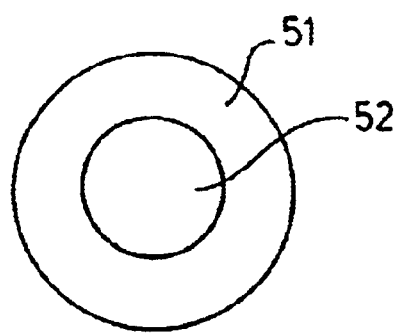
FIGS. 5a to 5d are end views of some different nozzle arrangements that can be utilized in performing the method of the invention.
Figure 5B:
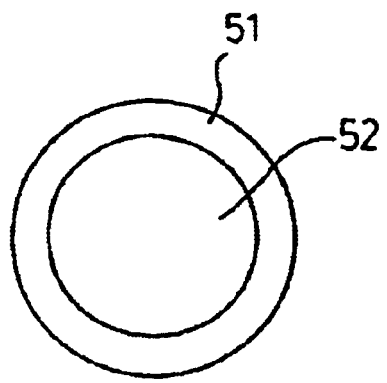
Figure 5C:
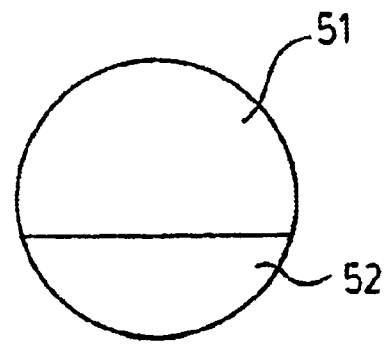
Figure 5D:
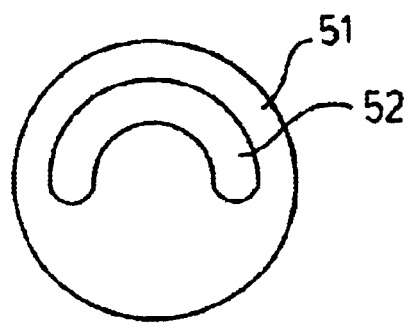

As shown in FIGS. 5a and 5b, the relative thickness of the outer layer relative to the core layer may vary. It is normally desirable that the outer layer and core are bonded securely together, and this will be facilitated if both the core and the outer layer are formed by resins of the same general type e.g., polyurethane, and cure at relatively the same rate.

Although the following examples make use of conventional two reactive-component thermosetting resin systems, the term two reactive-component in the context of the invention should be taken to include systems in which the second component is a gas or simply moisture. A number of moisture-curing foamable compositions are known, and these may be used for the core, as well as for the outer layer, provided that the moisture required for curing may reach the core. Thus the necessary moisture for the core composition may be contained in the outer layer material or be produced as a by-product of its curing or may permeate through the outer layer, if the latter is an open cell foam, or the core may be moisture-cured by direct application of moisture, if the core is extruded using nozzles which provide an extrusion in which the core is not fully enveloped by the outer layer.

The following examples illustrate conventional two reactive-component core materials.

EXAMPLE 1

A weather, water, and UV resistant gasket was prepared as follows:

| A core composition was produced by combining the following: | |
|---|---|
| Ethylene Oxide capped polyether triol (MW 4500) | 86.0 |
| Triethylene diamine (catalyst) | 1.0 |
| Silicone surfactant | 0.1 |
| Deionized water | 0.9 |
| Thixotrope (e.g. Cab-O-Sil) | 4.6 |
| MDI | 7.4 |
| Total | 100.0 |
| Polyol properties: | |
| Viscosity: | 35,000 cps |
| Thixotropic Index: | 4.5 |
| Mixed Properties: | |
| Gel time: | 3 minutes |
| Shore A Hardness: | 10 |
| Foam Density: | 0.25 gm/cc |
| Compression Set: | 2% |
| An elastomeric outer layer was produced by combining the following: | |
| Polyether Diol (MW) 1000 | 34.7 |
| Polyether Triol (MW) 600 | 42.7 |
| Catalyst (e.g. Dibutyl Tin Dilaurate) | 1.0 |
| White Pigment (Titanium Dioxide) | 9.3 |
| Thixotrope | 5.0 |
| Isophorone Diisocyanate | 7.7 |
| Total | 100.0 |
| Polyol properties: | |
| Viscosity: | 60,000 cps |
| Thixotropic Index: | 4.5 |
| Mixed Properties: | |
| Gel Time: | 5 minutes |
| Shore A Hardness: | 80 |
| Cured Density: | 1.05 gm/cc |
| Water Absorption: | <1% |
| Weather Resistance: | 500 hours - no yellowing (Xenon Arc Weatherometer) |

The above materials were co-dispensed into a "D" shaped gasket of 0.5" diameter and 0.25" high. The white elastomer enclosed the entire gasket and was 0.01" thick.

The co-dispensed gasket had the following properties. It was less expensive and had superior properties to an aliphatic isocyanate foam gasket. The elastomeric outer layer provided superior water resistance and Uw resistance to a gasket with a foam outer layer.

| | |
|---|---|
| Shore A Hardness: | 12 |
| Compression Deflection: | 4.0 psi |
| Cure Density: | 0.36 gm/cc |
| Water Absorption: | <1% |
| Weather Resistance: | 500 hours - no yellowing (Xenon Arc Weatherometer) |

EXAMPLE 2

A conductive gasket was prepared as follows:

| An core composition was produced by combining the following: | |
|---|---|
| Ethylene Oxide capped polyether triol (MW 4500) | 86.0 |
| Triethylene diamine (catalyst) | 1.0 |
| Silicone surfactant | 0.1 |
| Deionized water | 0.9 |
| Thixotrope (e.g. Cab-O-Sil) | 4.6 |
| MDI | 7.4 |
| Total | 100.0 |
| Polyol properties: | |
| Viscosity: | 35,000 cps |
| Thixotropic Index: | 4–5 |
| Mixed Properties: | |
| Gel time: | 3 minutes |
| Shore A Hardness: | 10 |
| Foam Density: | 0.25 gm/cc |
| Compression Set: | 2% |
| A conductive outer layer was produced by combining the following: | |
| Polyether Diol (MW) 1000 | 17.0 |
| Catalyst (e.g. Dibutyl Tin Dilaurate) | 2.0 |
| Silver Flakes, 20 micron | 76.5 |
| Polymeric diphenylmethane diisocyanate | 4.5 |
| Total | 100.0 |
| Polyol properties: | |
| Viscosity: | 70,000 cps |
| Thixotropic Index: | 3.0 |
| Mixed Properties: | |
| Gel Time: | 5 minutes |
| Shore A Hardness: | 90 A |
| Cured Density: | 2.7 gm/cc |
| Water Absorption: | <1% |
| Surface Resistivity: | 0.2 ohms/cm$^3$ |

A "D" shaped gasket of 0.5" diameter and 0.25" high was co-dispensed. The thickness of the conductive outer layer was 0.010". The co-dispensed gasket had the following properties:

| | |
|---|---|
| Shore A Hardness: | 15 |
| Compression Deflection: | 5.1 psi |
| Cure Density: | 0.5 gm/cc |
| Water Absorption: | <1% |
| Surface Resistivity: | 0.2 ohms/cm$^2$ |
| Compression Set: | <5% |

EXAMPLE 3

The following gasket was prepared:

Elastomeric Core:

| Part A | |
|---|---|
| RTV Silicone | 90.0 |
| Thixotrope (Cab-O-Sil) | 10.0 |
| Properties: | |
| Viscosity: | 50,000 cps |
| Thixotropic Index: | 5.0 |
| Part B | |
| RTV Silicone | 90.0 |
| Thixotrope (Cab-O-Sil) | 12.0 |
| Properties: | |
| Viscosity: | 35,000 cps |
| Thixotropic Index: | 4.0 |
| Mixed Properties: | |
| Mixing Ratio A/B: | 100/110 parts by weight |
| Gel Time: | 4 minutes |
| Shore A Hardness | 60 |
| Compression Deflection: | 70 psi |
| Moisture Curing Outer Layer | |
| Moisture Curing Silicone Polymer | 20.4 |
| Silver Plated Glass Spheres (30–50 microns avg) | 70.5 |
| Toluene | 9.1 |
| Total | 100.0 |

This conductive outer layer was cured at ambient temperature and 50% R.H. for 7 days.

| Properties | |
|---|---|
| Shore A Hardness: | 40 |
| Surface Resistivity: | 0.6 ohm/cm$^2$ |
| Compression Deflection | 65 psi |

A round gasket ¼" diameter was co-dispensed. The thickness of the conductive layer was 0.03". The co-dispensed gasket had the following properties:

| Properties | |
|---|---|
| Shore A Hardness: | 56 |
| Surface Resistivity: | 0.6 ohm/cm$^2$ |
| Compression Deflection | 62 psi |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed:

1. A gasket comprising a flexible or rigid core and a flexible or rigid outer layer prepared by co-dispensing at a temperature of about 15° C. to about 30° C., a core composition and an outer layer composition, wherein the core composition comprises at least two reactive components, the composition having a viscosity at 25° C. of less than $10^6$ cps, and the core composition forms a foam or elastomer.

2. The gasket of claim 1 wherein the outer layer composition comprises at least two components having a viscosity at 25° C. of less than $10^6$ cps, and the outer layer composition forms a foam or an elastomer.

3. The gasket of claim 1 wherein the core composition forms a foam, and the core composition completes foaming prior to drying or curing of the outer layer composition.

4. The gasket of claim 1 wherein the core composition forms a foam, and the outer layer composition forms a foam.

5. The gasket of claim 1 wherein the core composition forms a foam, and the outer layer composition forms a non-foamed elastomer.

6. The gasket of claim 1 wherein the outer layer composition forms a conductive elastomer or foam.

7. The gasket of claim 1 wherein the outer layer composition forms an ultra-violet resistant elastomer or foam.

8. The gasket of claim 1 wherein both the core composition and outer layer composition are elastomeric two reactive-component polyurethane resins.

9. The gasket of claim 1 wherein both the core composition and outer layer composition are elastomeric two reactive-component silicone resins.

10. The gasket of claim 1 wherein either the core composition or outer layer composition is a polyurethane and the other composition is a silicone.

11. The gasket of claim 1 wherein immediately after being dispensed from the nozzle of the meter-mix dispenser, the mixed core composition has a viscosity at 25° C. of less than $10^5$ cps.

12. The gasket of claim 2 wherein immediately after being dispensed from the nozzle of the meter-mix dispenser, the mixed outer layer composition has a viscosity at 25° C. of less than $10^5$ cps.

13. A method for producing a gasket or other object comprising co-dispensing a core composition and an outer layer composition at a temperature of about 15° C. to about 30° C., wherein the core composition forms an elastomer or a foam and comprises at least two reactive components, wherein each composition has a viscosity at 25° C. of less than $10^6$ cps.

14. The method of claim 13 further comprising allowing the co-dispensed core composition and outer layer composition to dry or cure.

15. The method of claim 14 wherein the core composition forms a foam and formulating the core composition and the outer layer composition to allow the core composition to complete its foaming prior to allowing drying or curing of the outer layer composition.

16. The method of claim 15 further comprising formulating the core composition to complete both foaming and drying or foaming and curing prior to allowing drying or curing of the outer layer composition.

17. The method of claim 13 wherein the outer layer composition contains a solvent, and further comprising allowing the solvent to evaporate from the outer composition.

18. The method of claim 13 wherein the temperature is about 20° C. to about 25° C.

19. The method of claim 13 wherein the core composition and the outer layer composition are co-dispensed into a mold.

20. The method of claim 13 wherein the core composition and the outer layer composition are co-dispensed in situ.

21. A method according to claim 13 wherein the core composition is an elastomeric resin and forms a foam during curing.

22. A method according to claim 13 wherein the outer layer composition is an elastomeric resin and remains unfoamed.

23. A method according to claim 13 wherein the outer layer composition is an elastomeric resin loaded with sufficient conductive particles to render the outer layer conductive.

* * * * *